July 13, 1943.     F. B. HOWELL     2,324,396
AUTOMOTIVE TRANSMISSION GEAR SHIFT-INDICATOR
Filed Sept. 8, 1941     3 Sheets-Sheet 1
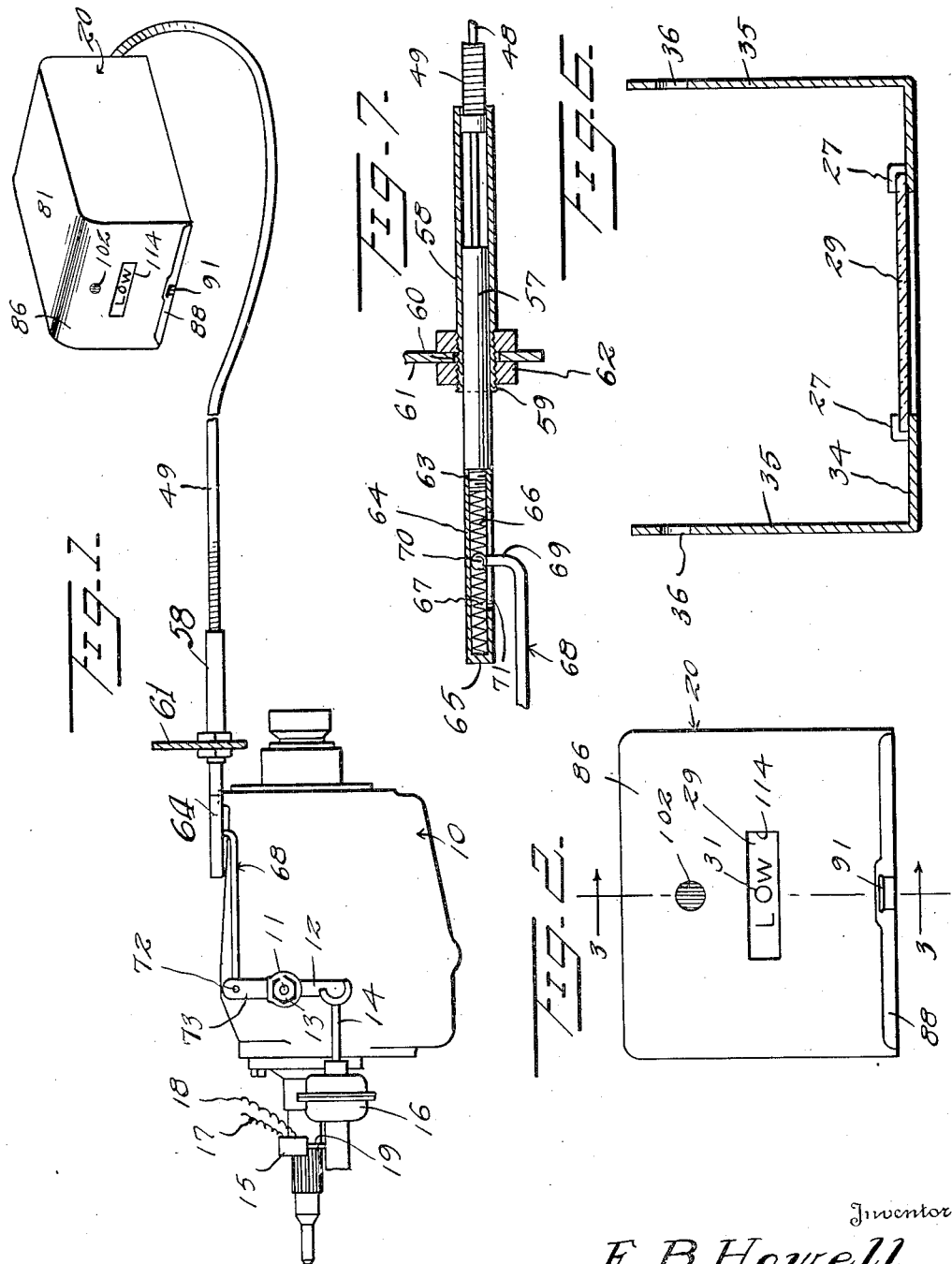
Inventor
F. B. Howell
By Kimmel & Crowell
Attorneys

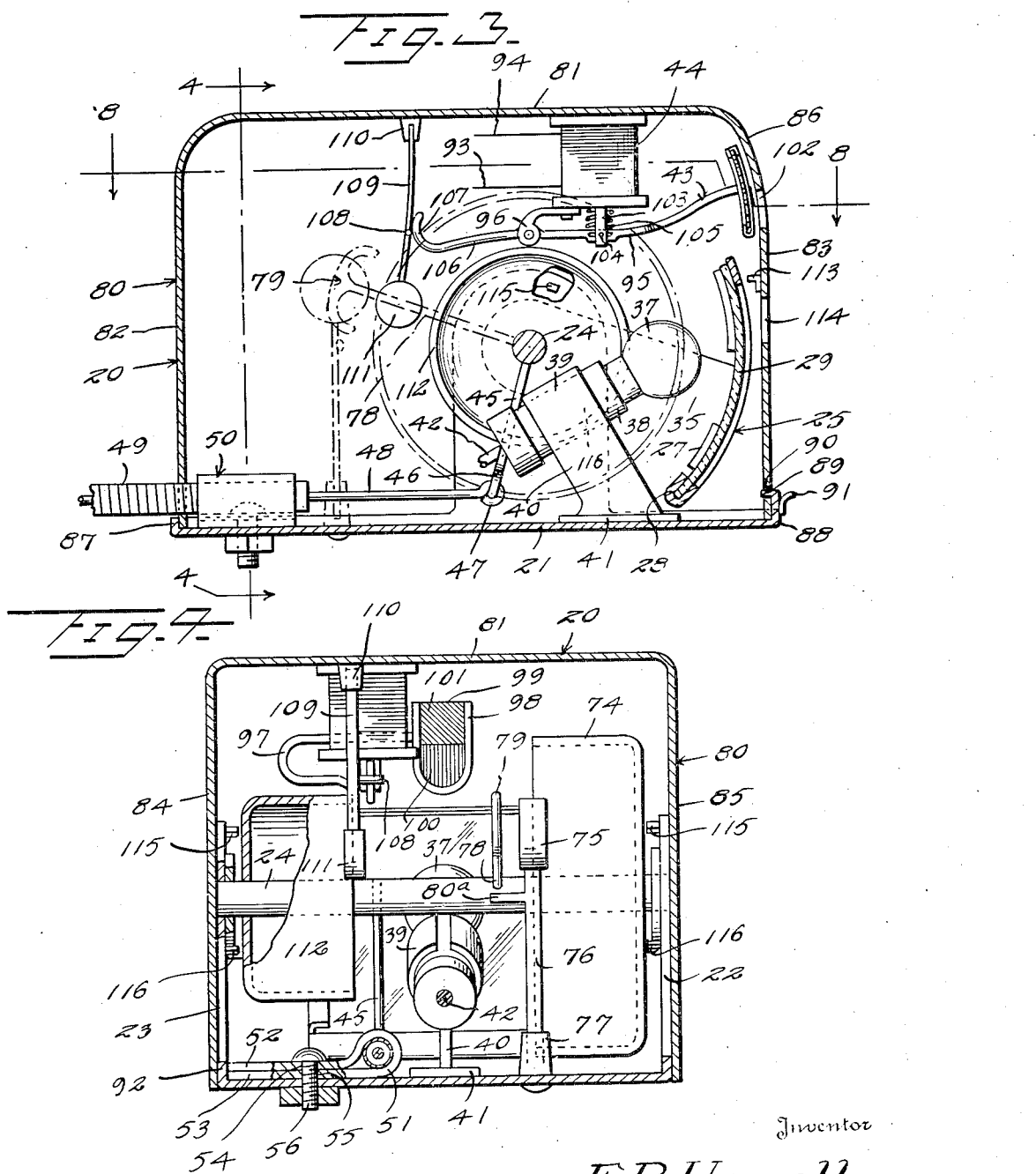

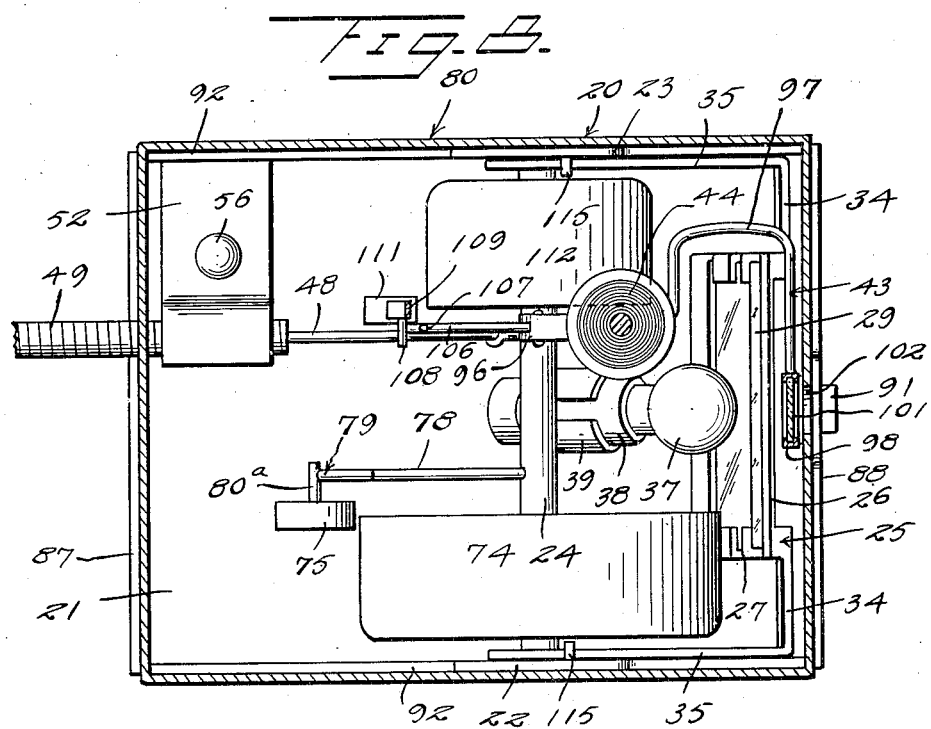
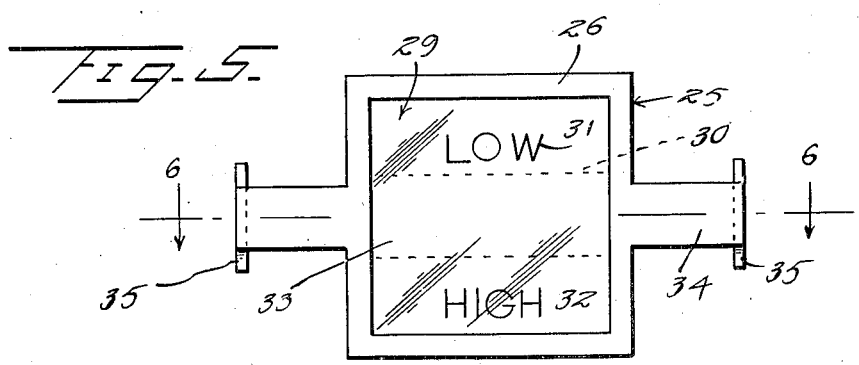
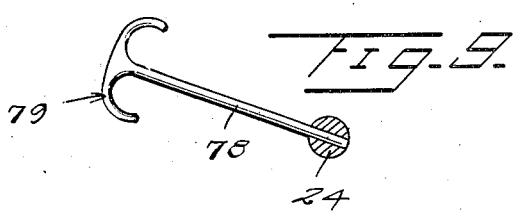

Patented July 13, 1943

2,324,396

UNITED STATES PATENT OFFICE 2,324,396

AUTOMOTIVE TRANSMISSION GEAR SHIFT-INDICATOR

Frederic B. Howell, Wilkes Barre, Pa.

Application September 8, 1941, Serial No. 410,116

6 Claims. (Cl. 116—4)

This invention relates to a gear shift indicator for automotive transmissions.

At the present time certain motor vehicles are provided with automatically operable gear shift mechanisms and the construction of the gears is such that the driver of the vehicle has no visible way of determining the gear positions. As a result of this condition the driver frequently operates the vehicle in an incorrect gear ratio. It is, therefore, an object of this invention to provide a simple attachment which is operatively connected with a part of the transmission and which will give both a visible indication of the gear position and will also give an audible signal at the time that the gear change has been made.

Another object of this invention is to provide a device of this kind which will give both an audible and a visible signal at the moment the gears are in a position for change from one speed or ratio to another so that the driver can regulate the operation of the vehicle to effect the desired gear change.

Another difficulty with certain types of automatic transmissions is that the gear change depends in large part upon an act by the driver performed at the proper moment. It has been found that frequently the driver performs his operation or act too late or too quickly, and in either case the change of gears is not effected, resulting in the excessive burning of fuel and the operation of the vehicle at an undesired gear ratio. It is, therefore, a further object of this invention to provide an attachment of this kind which will give the desired audible signal for changing of the gears, and at the same time will visibly show whether the gears have actually been changed so that the driver can readily see whether his act has effected the necessary gear change. Furthermore, the provision of the audible signal permits the driver to determine without looking at the signal device whether the gear change has been made. It will be appreciated that in heavy traffic the driver's attention is entirely taken up with properly operating the car and he cannot remove his attention from the car operation to look at the instrument board.

It is known that gear shift indicators have been produced which included an electric light for each gear shift, and such light would remain constantly lighted. However, such indicators have not proved practical because of the drain on the battery. The signal structure embodied in my invention eliminates any unnecessary battery drain and can be quickly attached to the present transmission structure without change and without affecting the operation of the transmission.

To the foregoing objects and to others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

Figure 1 is a diagrammatic view partly in section of a gear shift indicating means combined with an automatic transmission for a motor vehicle, Figure 2 is a detail front elevation of the indicator, Figure 3 is a longitudinal section taken substantially through the center of the indicator structure, Figure 4 is a sectional view taken on the line 4—4 of Figure 3, Figure 5 is a detail front elevation of the signal structure removed from the housing, Figure 6 is a sectional view taken on the line 6—6 of Figure 5, Figure 7 is a longitudinal sectional view through the flexible coupling between the signal structure and the transmission, Figure 8 is a sectional view taken on the line 8—8 of Figure 3, and Figure 9 is a side elevation, partly in section of one of the bell clapper operators.

Referring to the drawings the numeral 10 designates generally a vehicle transmission which in the present instance is an automatically operable transmission, that is, a transmission wherein the gear shifting is effected automatically upon the performance of one or more acts on the part of the driver with a correlated element associated with the transmission or with the vehicle engine.

The transmission 10 is provided with a laterally extending rock shaft 11 having associated therewith a gear shifting fork (not shown) forming the normal or conventional part of the transmission 10. A crank or arm 12 is secured by means of a fastening device 13 to the outer or extended end of the rock shaft 12 and the lower end of the arm or lever 12 is positioned in the path of an endwise movable pin or shaft 14. The pin or shaft 14 is normally locked against endwise movement until the vehicle attains a pre-determined speed. A solenoid 15 is associated with a vacuum pin or shaft operator 16 and is connected by means of a pair of conductors 17 and 18 to a centrifugally controlled switch (not shown) so that the solenoid 15 will be de-energized when the vehicle attains a pre-determined speed, and upon de-energization of the solenoid 15 the locking core 19 of the solenoid 15 will permit movement of the shaft or pin 14 to a released or disengaged position with respect to the crank or arm 12 at which time the shifting of the gears may proceed.

At the present time in the normal operation of the transmission 10 the gear changing operation is effected by some act on the part of the driver related with the automatic gear shifting mechanism. In certain instances this act consists in releasing the accelerator pedal after the vehicle attains a pre-determined speed, and when the accelerator pedal has been momentarily released and subsequently depressed, a click occurs in the transmission 10 which is a very faint audible signal indicating to the driver that the desired gear change has been effected.

Where considerable noise is present in the operation of the vehicle, either internally or externally of the vehicle the driver cannot readily hear the click in the transmission and, therefore, is unable to accurately determine whether the gear change has been effected so that the vehicle is frequently operated at an undesired gear ratio. It also frequently occurs that upon release of the accelerator pedal the speed of travel of the vehicle reduces to a point below the point where the centrifugal switch controlling member re-energizes the solenoid 15 and when this occurs the vacuum operator 19 is set in operation to move the pin 14 to a locked position with respect to the crank or arm 12.

In order, therefore, to provide a means whereby the driver of the vehicle may both visibly and audibly determine what gear ratio is in operation and also to determine the proper moment for depression of the accelerator pedal or other act on the part of the driver, I have provided a gear shift indicating structure generally designated as 20. The gear shift indicating mechanism 20 is therein shown as being mounted in a housing which is remote from the transmission 10 but it will be understood that the gear shift indicating mechanism may be mounted in any suitable housing which may be positioned either on the steering column or on the dashboard at a suitable point preferably closely adjacent the speedometer.

The gear shift indicating mechanism 20 includes a base plate 21 which has in the present instance formed integrally therewith a pair of upstanding bearing arms 22 and 23. A shaft 24 is journalled between the arms 22 and 23 and has fixed thereto a visible gear indicating means generally designated 25. The gear shift indicating means 25 includes a frame-like holder 26 which is substantially rectangular or square in the front elevation and which is of longitudinally arcuate configuration, as shown in Figure 3.

The opposite edges of the frame-like holder 26 are inwardly bent as at 27 and the lower edge of the frame 26 is bent upwardly as at 28 so as to form with the inwardly bent opposite side portions 27 a guide or pocket for receiving an arcuate transparent or translucent plate 29. The plate 29 may be of any suitable color and if desired certain portions thereof may be of different colors, as for instance the area of the plate 29 between the dotted lines 30 may be of a different color from the upper and lower portions of the plate 29.

The plate 29 is adapted to have positioned thereon indicia as at 31 and 32 which indicate at least two gear positions, and the intermediate portion of the plate 29 as indicated at 33 may be blank although if desired a suitable word, legend or other character may be placed in the intermediate portion 33 to indicate to the driver that the gear shifting mechanism is in a position proper for the desired change from one gear ratio to another. The frame structure 26 is formed with a pair of aligned laterally extending arms 34, and the arms 34 have formed integral therewith right angularly disposed levers 35 which extend rearwardly in the direction of the shaft 24. The arms 35, as shown in Figure 6, are each provided with an opening 36 adjacent the rear end thereof through which the shaft 24 extends and the shaft 24 may be fixed relative to the arms 35 in any suitable manner so that rocking of the shaft 24 will effect a rocking of the arms or levers 35 and also a vertical rocking of the frame structure 26.

In order to provide a means whereby the plate 29 may be illuminated, I have provided a light bulb 37 which is mounted in a socket 38. The socket 38 is carried by a sleeve 39 which is fixed relative to an upwardly and rearwardly extending support 40. The support 40 is fixed to a base plate 41 which may be secured in any suitable manner to the upper side of the base plate 21.

The light bulb 37 may be of the single contact type and a conductor 42 may extend from the socket 38 and be connected with the lighting system of the vehicle, so that the light bulb 37 will be lighted when the lights are illuminated on the vehicle. During operation of the vehicle in daylight the light bulb 37 normally will be unlighted.

The shaft 24 is adapted to be rocked by any suitable connection which is moved by means of a movable part of the transmission 10. In the present instance the shaft 24 is rocked by means of a Bowden wire forming a flexible coupling with the crank 12. The shaft 24 has fixed thereto a depending lever 45, and the lower end of the lever 45 is formed with an eye 46 which engages an eye 47 carried by one end of an elongated flexible wire 48. The wire 48 is slidably mounted in a flexible casing 49 and one end of the casing 49 is fixed to the base plate 21 by means of a holder generally designated as 50. The holder 50 is constructed from an elongated strip of metal which is bent reversibly upon itself to form a clamping loop or eye 51 and the opposite ends 52 and 53 of the strip are then disposed in superposed relation as shown in Figure 4. The superposed parts 52 and 53 are then provided with registering openings 54 and 55, respectively, through which a fastening bolt 56 is adapted to engage, the bolt 56 also engaging through the base 21.

The opposite end of the flexible wire or signal operator 48 is secured to a cylindrical slide member or rod 57 which is slidable in a cylindrical guide member 58. The guide member 58 is formed with a threaded rear portion 59, and is mounted in an opening 60 forming in a supporting bracket or arm 61 which is adapted to be secured in any suitable manner to a part of the vehicle adjacent the transmission 10. The sleeve 58 may be fixed relative to the supporting member 61 by means of a pair of lock nuts 62 which are threaded onto the threads 59.

The opposite or forward end of the sleeve 58 also engages about the adjacent end of the flexible casing 49 and the casing 49 is adapted to be fixed within the forward end of the guide sleeve 58 in any suitable manner.

The rear or projecting end portion of the slide member 57 is formed with a reduced threaded stud 63 on which a cylindrical coupling 64 is adapted to be threaded. The coupling 64 is provided with an end wall 65 and a pair of springs 66 and 67 are disposed within the coupling member 64. One end of the spring 67 bears against the end wall 65 and one end of the spring 66 bears against the stud 63. A link 68 is adapted to provide a connection between the slide member 57 and the rock lever 12. The link 68 is provided at its forward end with a right angularly disposed extension 69 which terminates in a ball or head 70.

The ball or head 70 is disposed between the adjacent or confronting ends of the two springs 66 and 67. The coupling member 64 is provided in the side thereof with an elongated slot or opening 71 through which the extension 69 loosely engages. The two springs 66 and 67 provide a resilient connection between the link 68 and the flexible wire 48 so that should the rock lever 12 have a greater rocking movement than is necessary for the proper operation of the signal structure, the link 68 may have movement with the lever 12 independent of the movement of the slide member 57 and the flexible wire 48. In this manner the limitation of the movement of the slide member 57 and the wire 48 will not effect the proper operation of the gear shifting mechanism.

The opposite or rear end of the link 68 is connected as at 72 to an L-shaped coupling member 73. The coupling member 73 is fixed relative to the lever 12 and in the present instance extends diametrically opposite from the shaft 11 from the extension of the lever 12.

In order to provide a means whereby an audible signal may be given coincident with the rocking of the visible indicator 25 I have provided a bell member 74 which is adapted to be mounted on and fixed relative to the shaft 24.

A clapper 75 is disposed rearwardly of the bell 74 and is mounted on the upper end of a resilient clapper support 76. The support 76 is fixed to a base 77 which engages the base 21 and is fixed relative to the latter. The clapper 75 is adapted to be actuated by means of a radially disposed clapper operator 78 which is fixed to the shaft 24 and is provided with a cam-shaped outer end portion 79.

A right angularly disposed pin or abutment 80a is fixed to the upper portion of the supporting member 76 in the path of the movement of the operator 78 and the cam-portion 79 thereof so that the resilient support 76 will be flexed rearwardly upon vertical rocking of the operator 78.

The signal structure hereinbefore described is adapted to be enclosed in a housing generally designated as 80. The housing 80 includes a top wall 81, a rear wall 82, a front wall 83 and side walls 84 and 85. The top wall 81 is formed as a continuation of the front and rear walls and preferably an arcuate portion 86 connects the upper end of the front wall 83 with the forward end of the top wall 81.

The base 21 at the rear thereof is provided with an upwardly extending right angular flange 87 and the base 21 at its forward edge is also provided with an upwardly extending right angular flange 88. The lower end of the rear wall 82 is adapted to engage forwardly of the rear flange 87, and the lower end of the front wall 83 is adapted to engage inwardly or rearwardly of the front flange 88.

A latch or bolt 89 is formed with the flange 88 and is adapted to engage in an opening or keeper 90 formed in the front wall 83 adjacent the lower end thereof. A finger-piece 91 is fixed to the flange 88 so that this flange may be bent or flexed forwardly in order to release the locking member 89 from the keeper 90. The opposite side edges of the base 21 are also provided with upwardly extending right angular flanges 92 which are engageable interiorly of the side walls 84 and 85.

It will be apparent from the foregoing that the housing 80 may be readily detached from the base 21 in order to expose the operating mechanism of the signal structure.

A second signal member generally designated as 43 is mounted within the housing 80 and includes a solenoid coil 44 which has conductors 93 and 94 connecting the coil 44 across the solenoid 15 so that the solenoid 44 will be energized at the same time that the coil or solenoid 15 is energized. A vertically rockable lever 95 is pivotally supported on a bearing structure 96 carried by the solenoid coil 44 and the lever 95 includes a substantially U-shaped forward portion 97 to which is secured an open substantially U-shaped frame 98. A translucent or colored plate 99 is carried by the U-shaped frame 98 and includes colored areas or portions 100 and 101 which are colored red and green respectively. The frame 98 is disposed inwardly of the arcuate portion 86 of the front wall 83 and when the coil 44 is energized, the lower or red portion 100 of the plate 99 is adapted to be positioned in confronting relation to a window or opening 102 provided in the upper portion of the front wall 83.

A vertically movable solenoid core 103 is operable within the coil 44 and is connected by means of a pivot 104 to the lever 95 at a point forwardly from the fulcrum of this lever. A spring 105 is disposed about the core 103 and one end of the spring 105 bears against the lower end of the coil 44 whereas the opposite or the lower end of the spring 105 bears against the lever 95. The lever 95 has a rearwardly extending clapper operator 106 which in the present instance is formed integral with the lever 95 and terminates at its rear end in a cam-portion 107. The cam portion 107 is adapted to engage an outstanding pin or abutment 108 which is carried by a flexible clapper operator or support 109.

The support 109 is dependingly carried by the top wall 81 being secured at its upper end in a mounting or base 110 which is fixed relative to the top wall 81. A clapper 111 is secured to the lower or free end of the clapper support 109 and is adapted to strike a bell 112 which is fixedly secured to the shaft 24 adjacent the end thereof opposite from the bell 74. When the lever 95 is drawn upwardly by the core 103 upon energization of the solenoid coil 44 the cam member 107 will hold the clapper 111 in rearwardly spaced relation with respect to the bell 112 as shown in Figure 3.

However, upon breaking of the electric circuit to the coil 44 the spring 105 will rock the lever 95 downwardly to bring the green area 101 of the plate 99 in confronting position to the window 102. At this time the cam portion 107 will be swung upwardly and the clapper 111 will be released and will strike the bell 112.

In the use and operation of this signal structure, the attachment hereinbefore described, is adapted to be connected with the transmission 10 by securing the angle member 73 to the upper side of the lever 12. The flexible wire 48 with the casing 49 may be of any desired length so as to position the signal structure 20 at the desired point where it can be heard and easily viewed by the driver. When the driver of the vehicle turns the ignition switch on, the solenoid 15 will be energized through the conductors 17 and 18, and prior to the movement of the vehicle the gear shifting mechanism including the operator 16 will be locked against movement.

At the time the electric circuit is closed to the solenoid 15, the electric circuit including the conductors will be closed so that the solenoid will be energized. After the vehicle attains a pre-determined speed the electric circuit including the conductors 17 and 18 will be broken and at the same time the electric circuit to the conductors will be broken. When the solenoid 15 is de-energized the locking member 19 will assume its normal position, thereby permitting the remainder of the gear shifting mechanism to rock the shifting fork shaft 11 from a low gear ratio to a higher gear ratio which will effect rotation of the shaft 11 in a clock-wise direction as viewed in Figure 1. The right angle member 73 will at this time be rocked forwardly and the link 68 will effect forward movement of the flexible wire or signal operator 48 in the casing 49. Forward movement of the operator 48 will rock the shaft 24 and raise the signal number 25 in proportion to the rocking of the shaft 11.

As an example, the signal structure 25 is initially disposed in the position shown in Figure 3 which is the starting or low position of the gear mechanism. After the vehicle attains a pre-determined speed, and the shaft 11 is rocked by the shifting mechanism, the movement of the link 68 is such as to bring into view the intermediate section 33 of the plate 29. At the same time that the signal structure 25 is rocked upwardly, the first operator 78 contacts with the pin 80ª of the support 76 so as to flex the support 76 rearwardly.

At the time the ignition switch is turned on so as to energize the solenoid 15 the solenoid 44 will be simultaneously energized and the core 103 will swing the lever 95 upwardly so as to bring the red area of the translucent plate 99 into registry with the window 102. After the vehicle attains a pre-determined speed the centrifugally controlling member correlated with the solenoid 15 will break the circuit thereto and also break the circuit to the solenoid 44 so that the spring 105 will rock the lever 95 downwardly, releasing the clapper 111 in order that the clapper 111 may strike the bell 112. The lever 95 may rock downwardly to the limit permitted by an angle-shaped stop member 113 which is secured to the inner side of the front wall 83 below the window 102.

When the crank or arm 12 rocks rearwardly or to the left as viewed in Figure 1 for a portion of the limit of its movement the flexible wire 48 will push the lever 45 forwardly and rock the shaft 24 in a counter clockwise direction thereby raising the frame 26 so as to bring the intermediate portion 33 of the translucent plate 29 into confronting relation to a window 114 carried by the front wall 83. At the time the cam portion 79 of the clapper operator 78 will be in engagement with the pin 80a so as to flex the support 76 rearwardly and hold the clapper 75 out of engagement with the bell 74. At the time the crank or arm 12 is rocked rearwardly to substantially the limit of its movement the flexible wire 48 will be pushed forwardly an additional distance thereby raising the signal member 25 to bring the indicia 32 into registry with the window 114.

At the time the signal member 25 is raised to the limit of its movement the arms 35 will strike an upper stop member 115 which is carried by the side walls of the housing 80. The contact of the arms 35 with the stop members 115 will make an audible click or sound which can readily be heard by the driver of the vehicle and which will be heard at substantially the same time that the clapper 75 strikes the bell 74. When the wire 48 is pulled rearwardly of the housing 80 by forward rocking of the crank or arm 12, the arms 35 will strike a lower stop member 116 carried by the side walls of the housing 80.

At the time the signal member 25 is rocked downwardly to the limit of its movement permitted by the stop members 116, the arm 78 will be rocked upwardly and the cam member 79 will again swing the clapper 75 rearwardly so that the clapper 75 will strike the bell 74.

While I have shown the gear shifting indicating structure as associated with an automatic transmission this signal structure or additional similar units may also be combined with a manually controlled gear shift mechanism which normally includes a movable gear shifting element operated in association with the gear shifting fork.

What is claimed is:

1. In a transmission having a rockable gear selecting shaft, a lever carried by said shaft, a movable indicating member for indicating a selected gear change, and a flexible connection between said member and said lever and a yieldable coupling between said flexible connection and said lever, rocking of said lever in either direction effecting movement of said member, said yieldable coupling permitting movement of said lever in excess of the movement of said member.

2. A gear shift indicator for connection with a transmission having a rockable speed changing shaft, said indicator comprising a base, a pair of upstanding bearings carried by said base, a shaft journalled in said bearings, a U-shaped signal frame fixed to said second shaft, an indicia bearing plate carried by said frame, a lever fixed at one end to said second shaft, a flexible operator fixed at one end to the opposite end of said lever, a flexible guide casing about said operator, means fixed to the opposite end of said operator for connection with said first shaft whereby rocking of said first shaft will effect simultaneous rocking of said second shaft and a yieldable coupling between said operator and said latter means.

3. A gear shift indicator for connection with a transmission having a rockable speed changing shaft, said indicator comprising a base, a pair of upstanding bearings carried by said base, a shaft journalled in said bearings, a U-shaped signal frame fixed to said second shaft, an indicia bearing plate carried by said frame, a lever fixed at one end to said second shaft, an indicia bearing plate carried by said frame, a lever fixed at one end to said second shaft, a flexible operator fixed at one end to the opposite end of said levers, a flexible guide casing about said operator, means fixed to the opposite end of said operator for connection with said first shaft whereby rocking of said first shaft will effect simultaneous rocking of said second shaft, and a housing carried by said base and enclosing said signal frame and said second shaft, said housing having a window for exposing indicia on said plate positioned in registry with said window.

4. A gear shift indicator for connection with a transmission having a rockable speed changing shaft, said indicator comprising a base, a pair of upstanding bearings carried by said base, a shaft journalled in said bearings, a U-shaped signal frame fixed to said second shaft, an indicia bearing plate carried by said frame, a lever fixed at one end to said second shaft, a flexible operator fixed at one end to the opposite end of said lever, a flexible guide casing about said operator, means fixed to the opposite end of said operator for connection with said first shaft whereby rocking of said first shaft will effect simultaneous rocking of said second shaft, a housing carried by said base enclosing said signal frame and said second shaft, said housing having a window for exposing indicia on said plate positioned in registry with said window and means within said housing correlated with said second shaft for producing an audible signal upon rocking of said second shaft.

5. A gear shift indicator for connection with a transmission having a movable speed changing element, said indicator comprising a movable signal frame, an indicia bearing plate carried by said frame, a flexible operator for said frame, a flexible guide casing about said operator, means also fixed to said operator for connection with said movable element whereby movement of said element will effect simultaneous movement of said frame, a housing supporting and enclosing said frame, said housing having a window for exposing indicia on said plate positioned in registry with said window, and inwardly projecting lugs within said housing correlated with said signal frame for producing an audible signal upon movement of said frame.

6. In a speed changing mechanism including a rockable selector shaft, a lever fixed to said shaft, a housing remote from said shaft and formed with a window, a second shaft rockable in said housing, an indicator member in said housing and movable relative to said window, means securing said indicator member to said second shaft, means connecting said lever and said second shaft together, and a yieldable coupling interposed on said connecting means whereby said first shaft and said lever may rock in either direction in excess of the rocking of said second shaft.

FREDERIC B. HOWELL.